(12) United States Patent
Hagiwara (10) Patent No.: US 11,194,226 B2
(45) Date of Patent: Dec. 7, 2021

(54) LENS DRIVING DEVICE, CAMERA DEVICE, AND ELECTRONIC APPARATUS

(71) Applicant: New Shicoh Motor Co., Ltd., Zhejiang (CN)

(72) Inventor: Kazuyoshi Hagiwara, Kanagawa (JP)

(73) Assignee: New Shicoh Motor Co., Ltd., Zhejiang (CN)

( * ) Notice: Subject to any disclaimer, the term of this patent is extended or adjusted under 35 U.S.C. 154(b) by 0 days.

(21) Appl. No.: 17/063,840

(22) Filed: Oct. 6, 2020

(65) Prior Publication Data

US 2021/0124237 A1 Apr. 29, 2021

(30) Foreign Application Priority Data

Oct. 24, 2019 (JP) .............................. JP2019-193136

(51) Int. Cl.
*G03B 5/02* (2021.01)
*G03B 17/12* (2021.01)
*G02B 7/02* (2021.01)

(52) U.S. Cl.
CPC .............. *G03B 5/02* (2013.01); *G02B 7/022* (2013.01); *G03B 17/12* (2013.01); *G03B 2205/0069* (2013.01)

(58) Field of Classification Search
CPC ..................................................... G03B 5/02
See application file for complete search history.

(56) References Cited

U.S. PATENT DOCUMENTS

| 2006/0016280 | A1* | 1/2006 | Hasegawa | G02B 7/102 |
| | | | | 74/89.23 |
| 2007/0177046 | A1* | 8/2007 | Makii | H04N 5/2254 |
| | | | | 348/335 |
| 2012/0092551 | A1* | 4/2012 | Ohishi | G03B 17/02 |
| | | | | 348/374 |
| 2014/0168793 | A1* | 6/2014 | Fukino | G02B 7/021 |
| | | | | 359/704 |
| 2015/0049397 | A1* | 2/2015 | Liu | G02B 7/08 |
| | | | | 359/824 |
| 2016/0139425 | A1* | 5/2016 | Park | G03B 5/04 |
| | | | | 359/557 |
| 2016/0219200 | A1* | 7/2016 | Kang | G02B 7/04 |
| 2020/0041872 | A1* | 2/2020 | Kopfer | G02B 7/09 |

FOREIGN PATENT DOCUMENTS

KR 10-1200080 11/2012

OTHER PUBLICATIONS

English language abstract of KR10-1200080.

* cited by examiner

*Primary Examiner* — Clayton E. LaBalle
*Assistant Examiner* — Dennis Hancock
(74) *Attorney, Agent, or Firm* — Fildes & Outland, P.C.

(57) ABSTRACT

Provided are a lens driving device, a camera device, and an electronic apparatus capable of suppressing an inclination of a guiding shaft. The lens driving device includes: a base including a bottom surface portion; a guiding shaft provided perpendicularly to the bottom surface portion of the base and a lens support guided by the guiding shaft. The base includes a base main body, and a support plate, which is made of a metal, and is provided in the base main body. One end of the guiding shaft is fixed to the support plate.

9 Claims, 12 Drawing Sheets

LENS DRIVING DEVICE, CAMERA DEVICE, AND ELECTRONIC APPARATUS

BACKGROUND OF THE INVENTION

1. Field of the Invention

The present invention relates to a lens driving device, a camera device, and an electronic apparatus.

2. Description of the Related Art

A small-sized camera is mounted on an electronic apparatus, e.g., a mobile phone or a smartphone. As this type of small-sized camera, for example, as disclosed in Korean Patent No. 10-1200080, there is known a small-sized camera having an autofocus function. The autofocus function is realized by moving, relative to a base, a lens support configured to support a lens. As a configuration in which the lens support is supported so as to be freely movable relative to the base, there has been known a type in which a guiding shaft is provided upright on the base to guide the lens support (for example, Korean Patent No. 10-1200080).

SUMMARY OF THE INVENTION

However, in general, the base is made of a resin, and hence fixing between the guiding shaft and the base is weak. Thus, there is a fear in that the guiding shaft is inclined due to loads applied from the lens and the lens support.

The present invention has an object to provide a lens driving device, a camera device, and an electronic apparatus capable of suppressing an inclination of a guiding shaft.

One aspect of the present invention is a lens driving device. The lens driving device includes: a base including a bottom surface portion; a guiding shaft provided perpendicularly to the bottom surface portion of the base; and a lens support guided by the guiding shaft, the base including: a base main body; and a support plate, which is made of a metal, and is provided in the base main body, wherein one end of the guiding shaft is fixed to the support plate.

Preferably, the base main body is made of a resin, and the support plate is embedded in the base main body. The support plate is formed along an entire periphery of the base.

Preferably, the guiding shaft includes: a guiding shaft main body portion; and an insertion portion formed integrally with the guiding shaft main body portion. The insertion portion is inserted in an insertion hole formed in the support plate. The insertion portion of the guiding shaft is caulked to be fixed to the support plate. The insertion portion may be thicker than the guiding shaft main body portion. The guiding shaft may include a flange portion formed between the guiding shaft main body portion and the insertion portion so as to be thicker than the guiding shaft main body portion and the insertion portion, and the flange portion may be held in abutment against the support plate.

Another aspect of the present invention is a camera device. The camera device includes: the lens driving device of the above aspects; and a lens supported by the lens support.

Still another aspect of the present invention is an electronic apparatus. The electronic apparatus includes the camera device of the above aspect.

According to the present invention, the guiding shaft is fixed to the support plate made of a metal. Thus, fixation of the guiding shaft to the base can be reinforced, thereby being capable of suppressing the inclination of the guiding shaft.

DESCRIPTION OF THE EMBODIMENTS

An embodiment of the present invention is described with reference to the drawings.

FIG. 1 to FIG. 14 are illustrations of an embodiment of the present invention.

Figure 1:
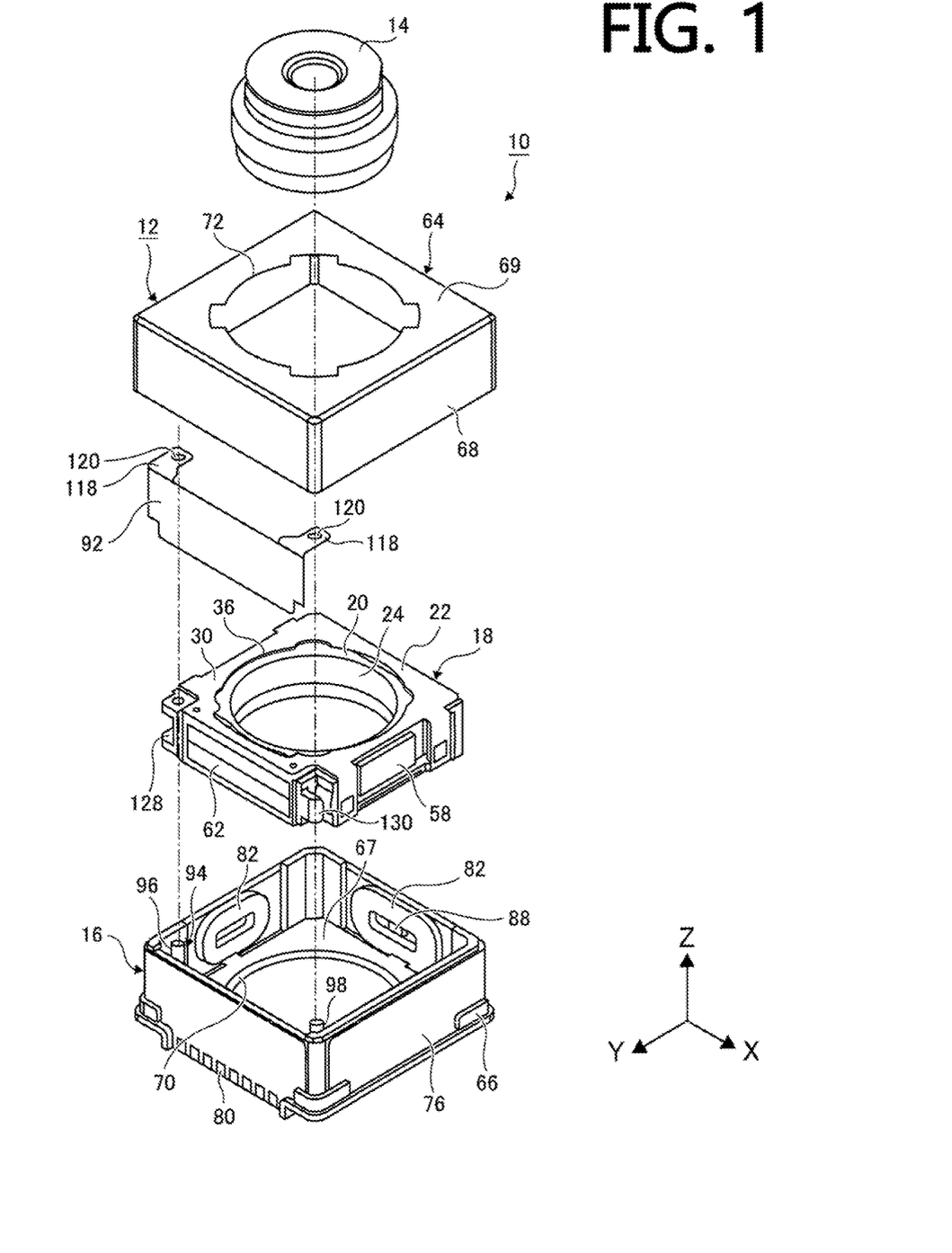
FIG. 1 is an exploded perspective view for illustrating a camera device according to an embodiment of the present invention as viewed obliquely from above.

FIG. 1 is an illustration of a camera device 10 according to the embodiment of the present invention. The camera device 10 includes a lens driving device 12 and a lens 14 mounted to the lens driving device 12.

Figure 2:
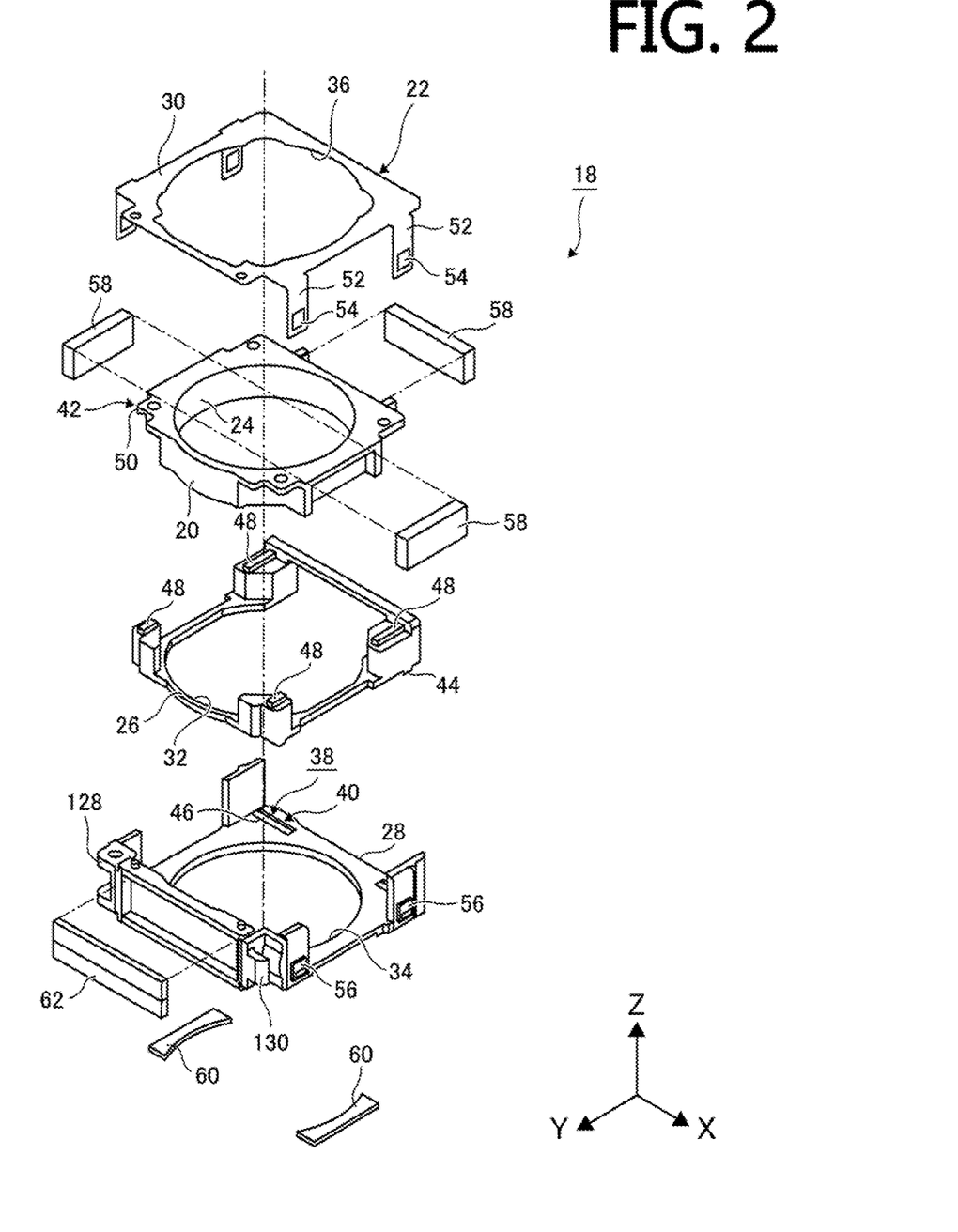
FIG. 2 is an exploded perspective view for illustrating a moving body used in the camera device according to the embodiment of the present invention as viewed obliquely from above.
Figure 3:
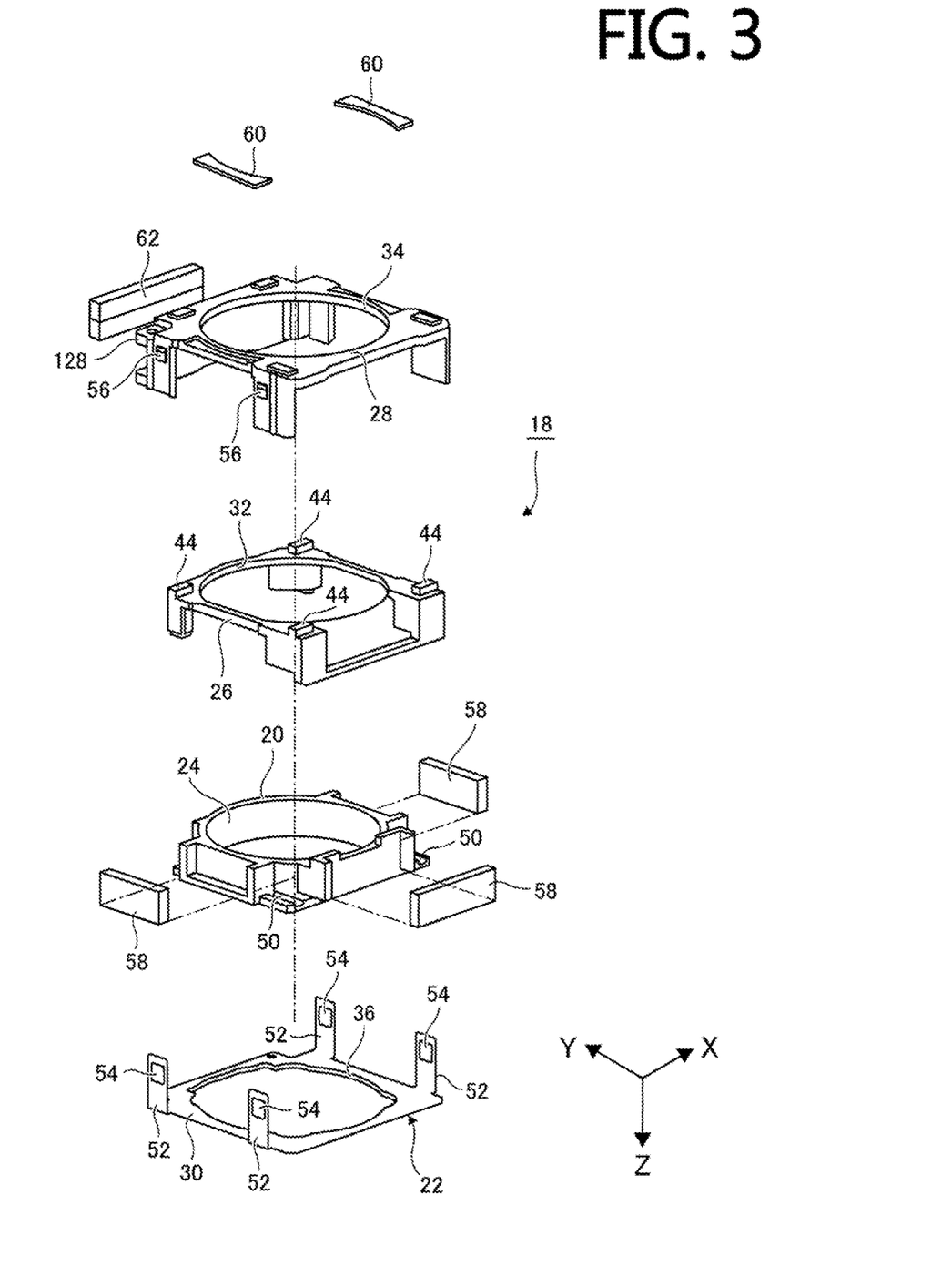
FIG. 3 is an exploded perspective view for illustrating the moving body used in the camera device according to the embodiment of the present invention as viewed obliquely from below.

The lens driving device 12 includes a fixed body 16 and a moving body 18 supported so as to be freely movable relative to the fixed body 16. First, the moving body 18 is described below. As illustrated in FIG. 2 and FIG. 3, the moving body 18 includes a lens support 20 and a first frame member 22 surrounding the lens support 20. The lens support 20 and the first frame member 22 each have a substantially quadrangular outer shape as viewed from above.

For the sake of convenience, an optical axis direction of the lens 14 is herein referred to as "Z direction", a direction orthogonal to the optical axis direction is referred to as "X direction", and a direction orthogonal to the Z direction and the X direction is referred to as "Y direction". Further, an object side of an optical axis is referred to as "upper side", and a side which is opposite to the upper side and on which an image sensor (not shown) is to be arranged is referred to as "lower side".

The lens support 20 has a lens mounting hole 24. The lens mounting hole 24 has a circular shape as viewed from the Z direction and is formed on the inner side of the lens support 20. The lens 14 is mounted to the lens mounting hole 24.

first frame member 22 includes a first moving body plate 26, a second moving body plate 28, and a first cover 30. The lens support 20, the first moving body plate 26, and the second moving body plate 28 are each made of engineering plastics such as liquid crystal polymer (LCP), polyacetal, polyamide, polycarbonate, modified polyphenylene ether, and polybutylene terephthalate. Further, the first cover 30 is made of, for example, a metal. The first moving body plate 26, the second moving body plate 28, and the first cover 30 have openings 32, 34, and 36, respectively, for allowing passage of light therethrough. The openings 32, 34, and 36 are each formed to have a substantially circular shape.

The first frame member 22 supports the lens support 20 so as to be freely movable in the Y direction and the X direction. That is, the first frame member 22 includes an orthogonal-direction support mechanism 38, and is configured so that the lens support 20 is freely movable in XY directions via the orthogonal-direction support mechanism 38.

Figure 4:
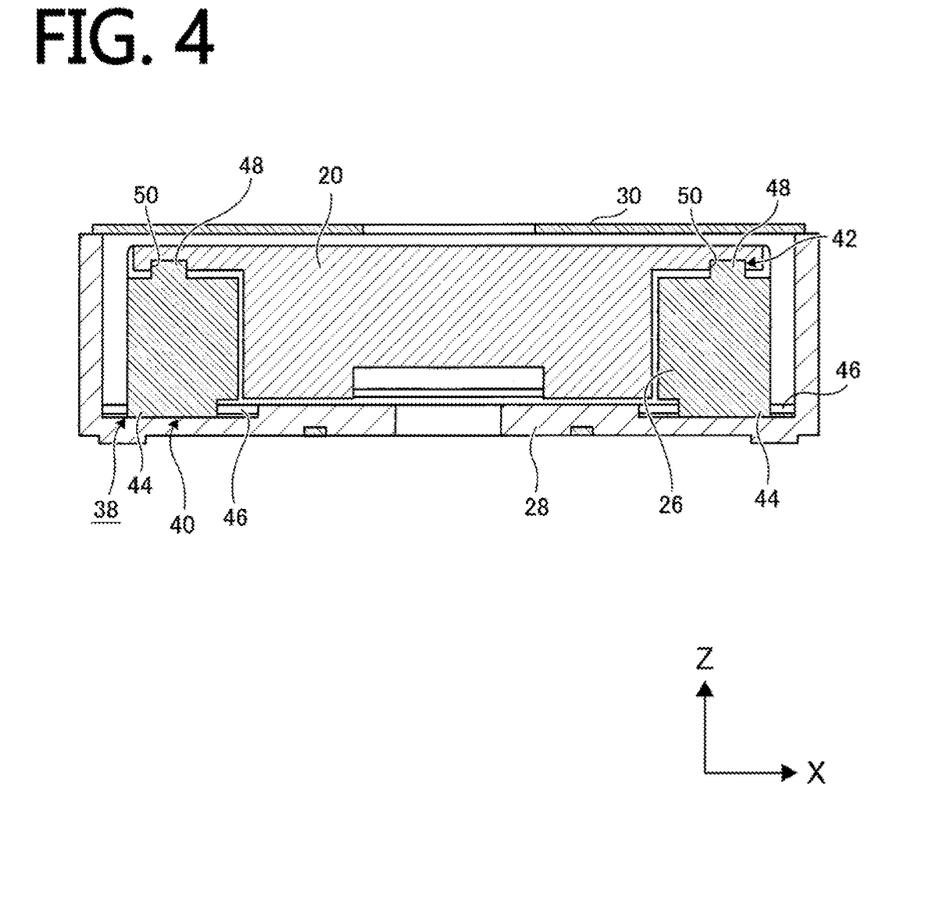
FIG. 4 is a sectional view for illustrating the moving body used in the camera device according to the embodiment of the present invention, which is taken along an XZ plane.
Figure 5:
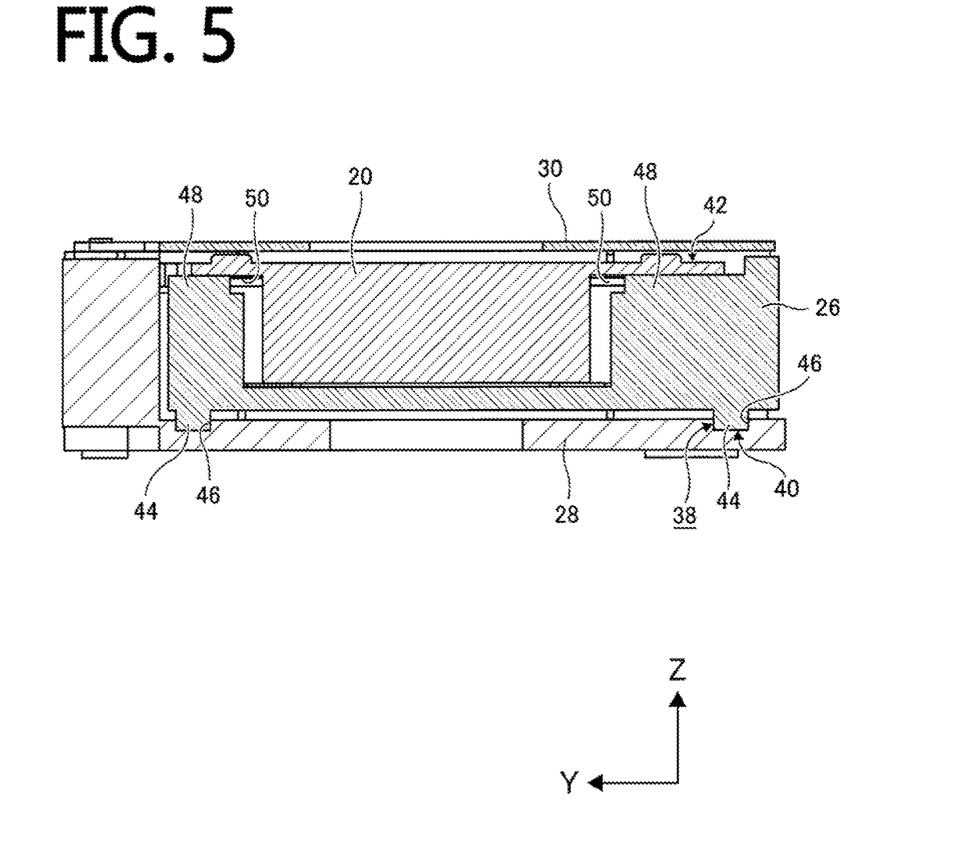
FIG. 5 is a sectional view for illustrating the moving body used in the camera device according to the embodiment of the present invention, which is taken along a YZ plane.

The orthogonal-direction support mechanism 38 includes a first support mechanism 40 and a second support mechanism 42 that are provided away from each other in the Z direction. The first support mechanism 40 is provided on the lower side in the Z direction, and as illustrated in FIG. 4 and FIG. 5, includes a first support portion 44 formed so as to protrude on a lower surface of the first moving body plate 26 and a first guiding portion 46 formed so as to be recessed in an upper surface of the second moving body plate 28. The first support portion 44 is fitted to the first guiding portion 46. The first support portion 44 and the first guiding portion 46 extend in the X direction, and are formed in the vicinity of each of four corner portions of the first moving body plate 26 and the second moving body plate 28. The first support portion 44 and the first guiding portion 46 extending in the X direction are fitted to each other so as to regulate movement in the Y direction, and hence the first moving body plate 26 is freely movable only in the X direction relative to the second moving body plate 28. The first support portion 44 and the first guiding portion 46 are surrounded by three orthogonal lines in a cross section (see FIG. 5) taken along the Z direction in the Y direction, and are brought into surface contact with each other in three planes (opposed side surfaces and lower surface) in the X direction.

The second support mechanism 42 is provided on the upper side in the Z direction, and as illustrated in FIG. 4 and FIG. 5, includes a second support portion 48 formed so as to protrude on an upper surface of the first moving body plate 26 and a second guiding portion 50 formed so as to be recessed in a lower surface of the lens support 20. The second support portion 48 is fitted to the second guiding portion 50. The second support portion 48 and the second guiding portion 50 extend in the Y direction, and are formed in the vicinity of each of four corner portions of the lens support 20 and the first moving body plate 26. The second support portion 48 and the second guiding portion 50 extending in the Y direction are fitted to each other so as to regulate movement in the X direction, and hence the lens support 20 is freely movable only in the Y direction relative to the first moving body plate 26. The second support portion 48 and the second guiding portion 50 are surrounded by three orthogonal lines in a cross section (see FIG. 4) taken along the Z direction in the X direction, and are brought into surface contact with each other in three planes (opposed side surfaces and upper surface) in the X direction.

Figure 6:
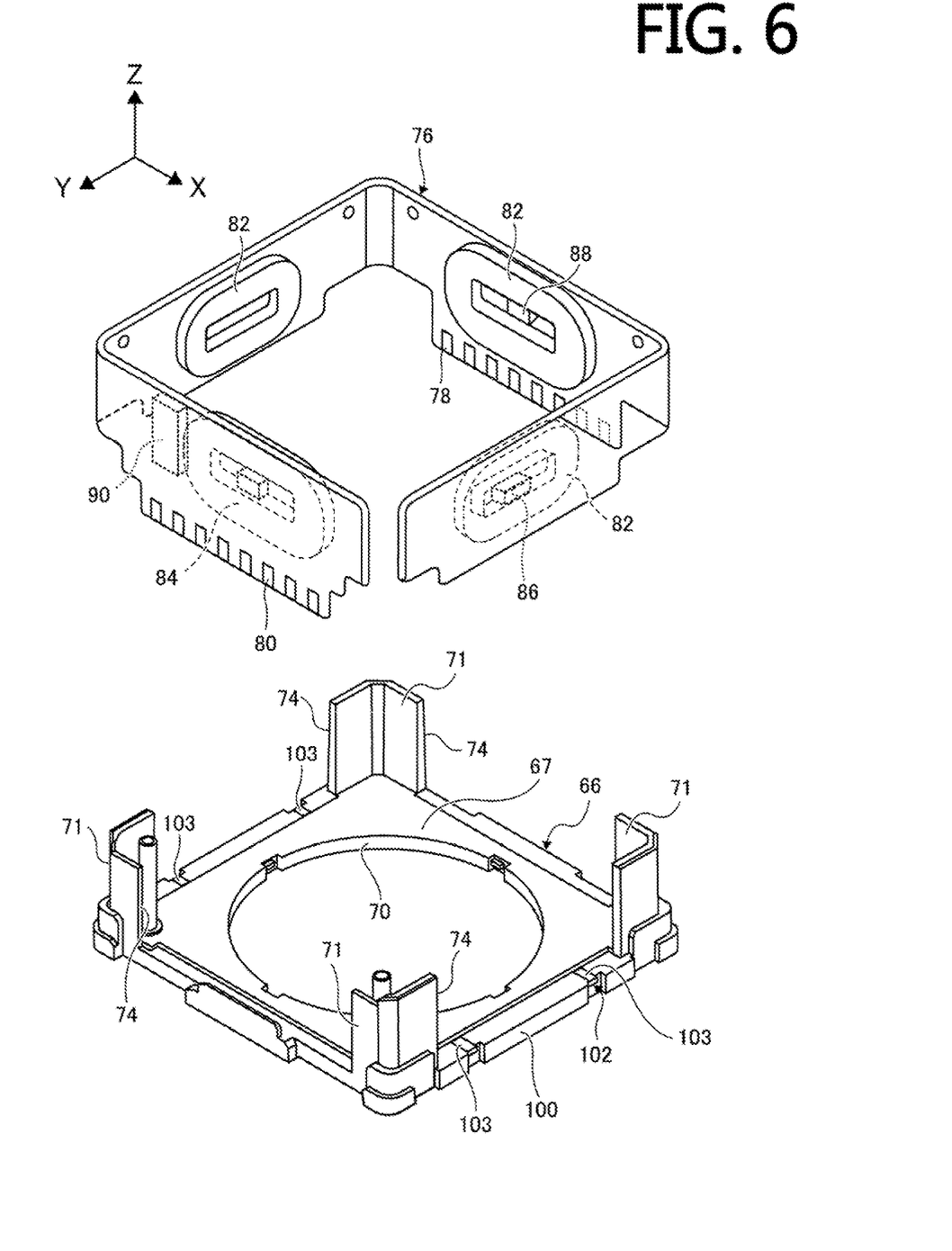
FIG. 6 is a perspective view for illustrating a flexible printed board and a base used in the camera device according to the embodiment of the present invention.
Figure 7:
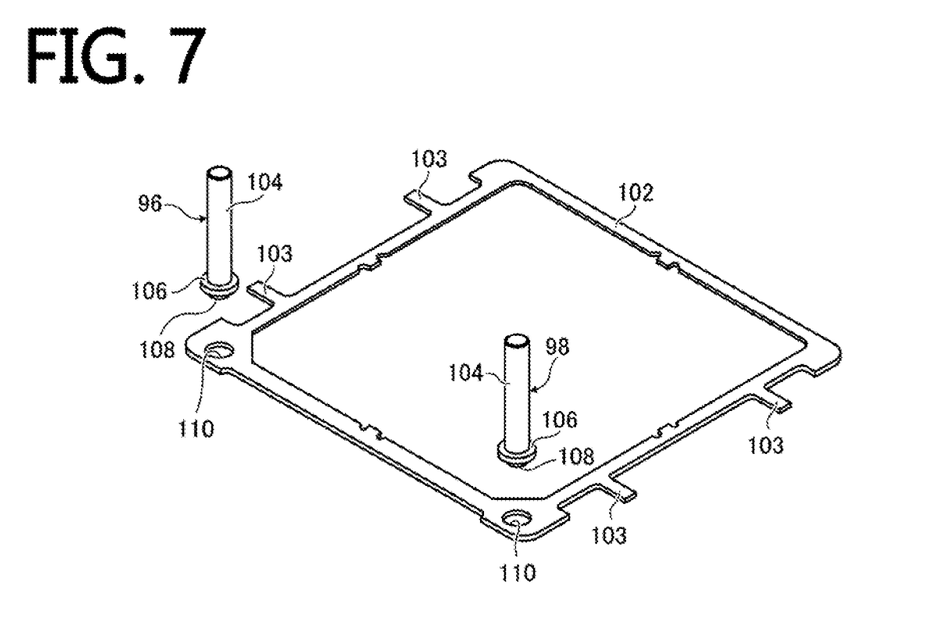
FIG. 7 is an exploded perspective view for illustrating a support plate, a first guiding shaft, and a second guiding shaft used in the camera device according to the embodiment of the present invention.

At each of four corners of the first cover 30, amounting portion 52 is provided so as to extend downward in the Z direction. The mounting portion 52 has a quadrangular mounting hole 54. Further, at each of four corners of the second moving body plate 28, a mounted portion 56 is formed so as to laterally protrude. The mounted portion 56 is fitted to the mounting hole 54 so that the first cover 30 is fixed to the second moving body plate 28. Between a lower surface of the first cover 30 and the upper surface of the lens support 20, as illustrated in FIG. 6 and FIG. 7, there is ensured a necessity minimum gap including an error caused by a tolerance or the like so as to regulate movement of the lens support 20 or the first moving body plate 26 in the Z direction relative to the second moving body plate 28.

On the outer side of the lens support 20, first magnets 58 are fixed on two surfaces in the X direction and one surface in the Y direction. Each of the first magnets 53 and 58 on the two surfaces in the X direction has an S pole and an N pole formed in the X direction. Further, the first magnet 58 on the one surface in the Y direction has an S pole and an N pole formed in the Y direction.

Further, on two surfaces in the X direction in a lower surface of the second moving body plate 28, first magnetic members 60 and 60 made of a magnetic substance are provided. The first magnetic members 60 and 60 are opposed in the Z direction to the first magnets 58 and 58 on the two surfaces in the X direction through intermediation of the second moving body plate 28. An attraction force is generated between the first magnetic members 60 and 60 and the first magnets 58 and 58. Therefore, the lens support 20 and the first moving body plate 26 are attracted through intermediation of the second moving body plate 28, and Z-direction contact is maintained between the first support portion 44 and the first guiding portion 46 and between the second support portion 48 and the second guiding portion 50.

Further, on the second moving body plate 28, a second magnet 62 is fixed on an outer surface on the opposite side of the surface on which the first magnet 58 is provided in the Y direction. The second magnet 62 is divided into two pieces in the Z direction. Each of the two pieces has an S pole and an N pole formed in the Y direction, and opposite polarities are provided in the vertical direction.

Next, a relationship between the fixed body 16 and the moving body 18 is described.

Referring back to FIG. 1, the fixed body 16 includes a second frame member 64. The second frame member 64 surrounds the periphery of the first frame member 22 of the moving body 16. The second frame member 64 includes a base 66 and a second cover 68. Each of the base 66 and the second cover 68 has a square shape as viewed from above. The second cover 68 is fitted to the outer side of the base 66 to form the second frame member 64. Further, a bottom surface portion 67 of the base 66 and an upper surface portion 69 of the second cover 68 have through holes 70 and 72, respectively, for allowing passage of light or insertion of the lens 14 therethrough.

Further, as illustrated in FIG. 6, a pillar portion 71 is formed at each of four corner portions of the base 66 so as to extend from the bottom surface portion 67 upward and upright. Further, an opening portion 74 is formed in each of four side surfaces of the base 66 between the pillar portions 71. The opening portion 74 is opened upward. A flexible printed board 76 is arranged on the outer side of the base 66 so as to surround the pillar portions 71 and the opening portions 74. That is, as illustrated in FIG. 6, the flexible printed board 76 is bent into a quadrangular shape so as to surround the outer shape of the base 66, and at a lower portion of the flexible printed board 76, a first terminal portion 78 and a second terminal portion 80 are formed. The second terminal portion 80 is opposed to the first terminal portion 78 in the Y direction. Energization to a first coil 82 to be described later is controlled via the first terminal portion 78, and energization to a second coil 84 to be described later is controlled via the second terminal portion 80, but the present invention is not limited thereto.

On the inner side of the flexible printed board 76, the first coils 82 are fixed on two surfaces in the X direction and one surface in the Y direction. Further, the second coil 84 is fixed on another surface in the Y direction on the inner side of the flexible printed board 76. Further, on the inner side of the flexible printed board 76, an X-direction position detecting element 86 is arranged inside one first coil 82 in the X direction, a Y-direction position detecting element 88 is arranged inside the first coil 82 in the Y direction, and a Z-direction position detecting element 90 is arranged on the lateral side of the second coil 84.

The first coils 82 and 82 provided on the two surfaces in the X direction are electrically connected to each other in series.

The first coils 82, the X-direction position detecting element 86, and the Y-direction position detecting element 88 face the inner side of the base 66 through the opening portions 74, and are opposed to the first magnets 58. Similarly, the second coil 84 and the Z-direction position detecting element 90 face the inner side of the base 66 through the opening portion 74, and are opposed to the second magnet 62.

Further, as illustrated in FIG. 1, on the outer side of the flexible printed board 76, a second magnetic member 92 made of a magnetic substance is provided. The second magnetic member 92 is opposed to the second magnet 62 through intermediation of the flexible printed board 76 and the second coil 84. Magnetic fluxes from the second magnet 62 flow through the second magnetic member 92 so that an attraction force is generated between the second magnet 62 and the second magnetic member 92. Therefore, in the moving body 18, an attraction force acts in the Y direction of the fixed body 16.

As illustrated in FIG. 1, the moving body 18 is supported by an optical axis-direction support mechanism 94 so as to be freely movable relative to the fixed body 16 in the Z direction. The optical axis-direction support mechanism 94 includes a first guiding shaft 96 and a second guiding shaft 98 provided in the fixed body 16, and a third support portion and a fourth support portion 130 formed in the moving body 18.

The first guiding shaft 96 and the second guiding shaft 98 are each made of a metal. In this embodiment, the first guiding shaft 96 and the second guiding shaft 98 are each formed as a column extending in the Z direction.

Each of the first guiding shaft 96 and the second guiding shaft 98 has a circular shape in an XY-direction cross section, but may have a shape of a part of a circle, or an oval or polygonal shape other than the circular shape.

A lower end of the first guiding shaft 96 and a lower end of the second guiding shaft 98 are fixed to vicinities of end portions of the bottom surface portion 67 of the base 66 in the Y direction.

As illustrated in FIG. 6 to FIG. 10, the base 66 includes a base main body 100 and a support plate 102. The base main body 100 is made of a resin. The support plate 102 is made of a metal, and is provided in the bottom surface portion 67 of the base 66 and embedded in the base main body 100. The base 66 is formed by insert molding so that the support plate 102 is embedded in the base main body 100. The support plate 102 is formed of a quadrangular frame, and is embedded along an entire periphery of the base main body 100 so as to be sandwiched in the base main body 100 from both sides of the support plate 102 in the Z direction.

Figure 8:
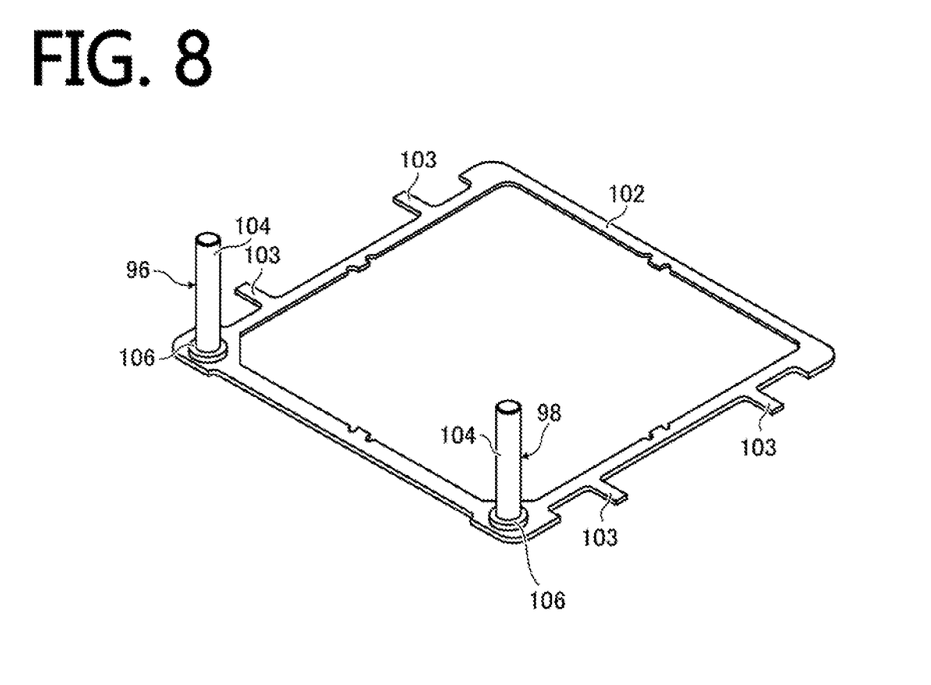
FIG. 8 is a perspective view for illustrating an assembled state of the support plate, the first guiding shaft, and the second guiding shaft used in the camera device according to the embodiment of the present invention.
Figure 9:
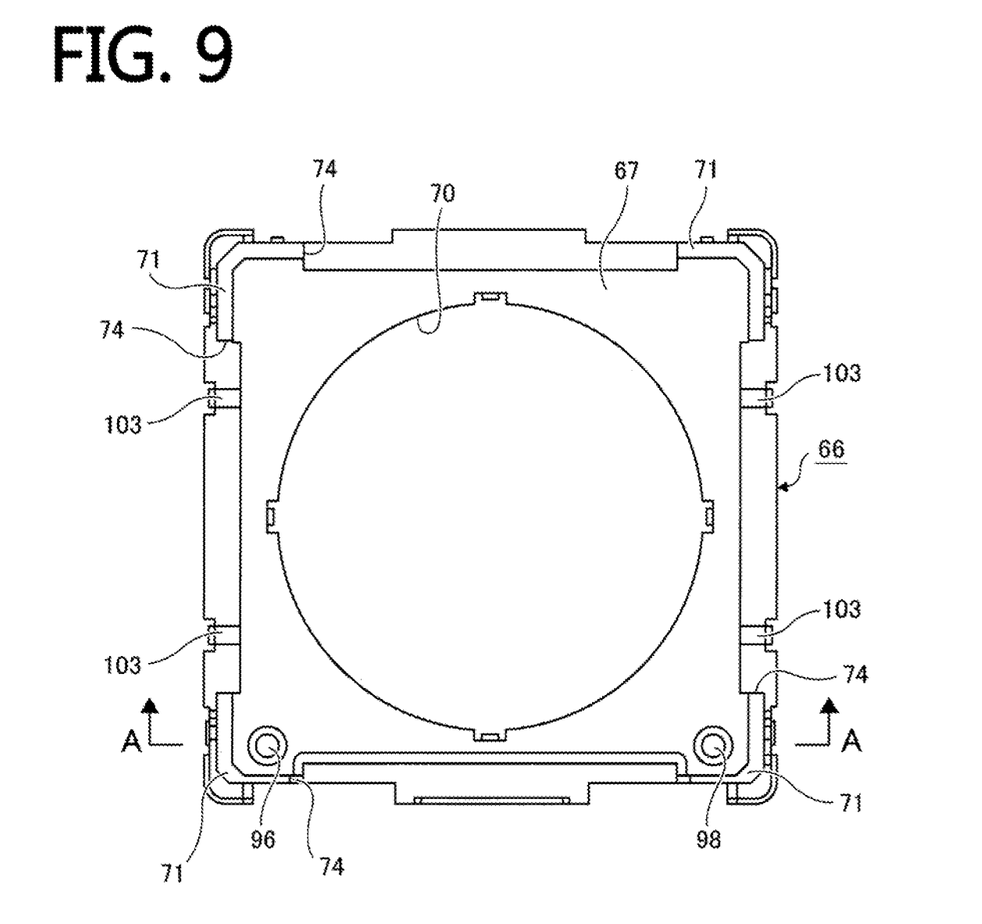
FIG. 9 is a plan view for illustrating the support plate, the first guiding shaft, and the second guiding shaft used in the camera device according to the embodiment of the present invention.
Figure 10:
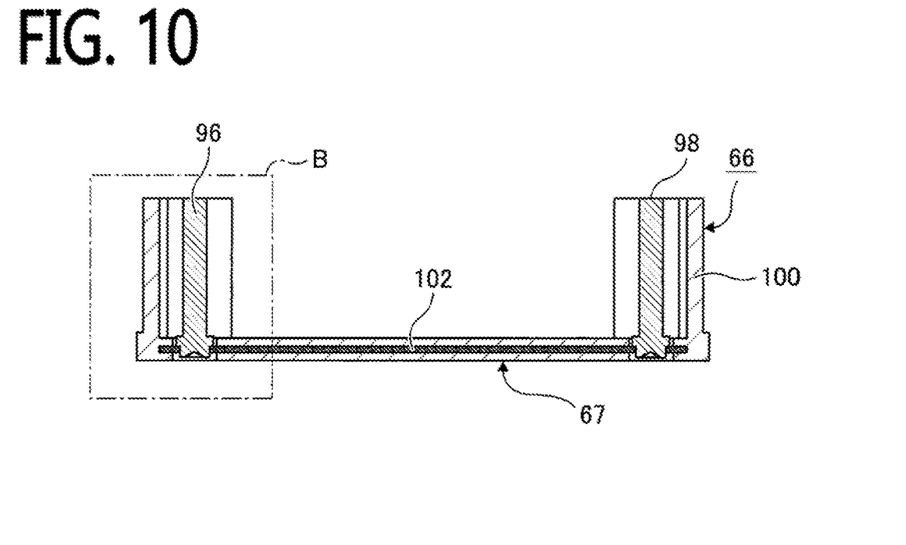
FIG. 10 is a sectional view for illustrating the support plate, the first guiding shaft, and the second guiding shaft used in the camera device according to the embodiment of the present invention, which is taken along the line A-A of FIG. 9.

As illustrated in FIG. 7 and FIG. 8, cut portions 103 are formed on each side of the support plate 102 in the X direction so as to protrude. The cut portions 103 are portions formed by cutting connection portions after the plurality of bases 66 are formed by insert molding through the connection portions.

Each of the first guiding shaft 96 and the second guiding shaft 98 integrally includes a guiding shaft main body portion 104, a flange portion 106, and an insertion portion 108 in the stated order from an upper portion to a lower portion of each of the first guiding shaft 96 and the second guiding shaft 98. The insertion portion 108 is formed at a lower end of each of the first guiding shaft 96 and the second guiding shaft 98, and the flange portion 106 is formed on a portion slightly above the insertion portion 108. The insertion portion 108 is formed so as to be thicker than the guiding shaft main body portion 104 in order to easily stabilize a posture when each of the first guiding shaft 96 and the second guiding shaft 98 is assembled. The flange portion 108 is formed so as to be thicker than the guiding shaft main body portion 104 and the insertion portion 108.

Figure 11:
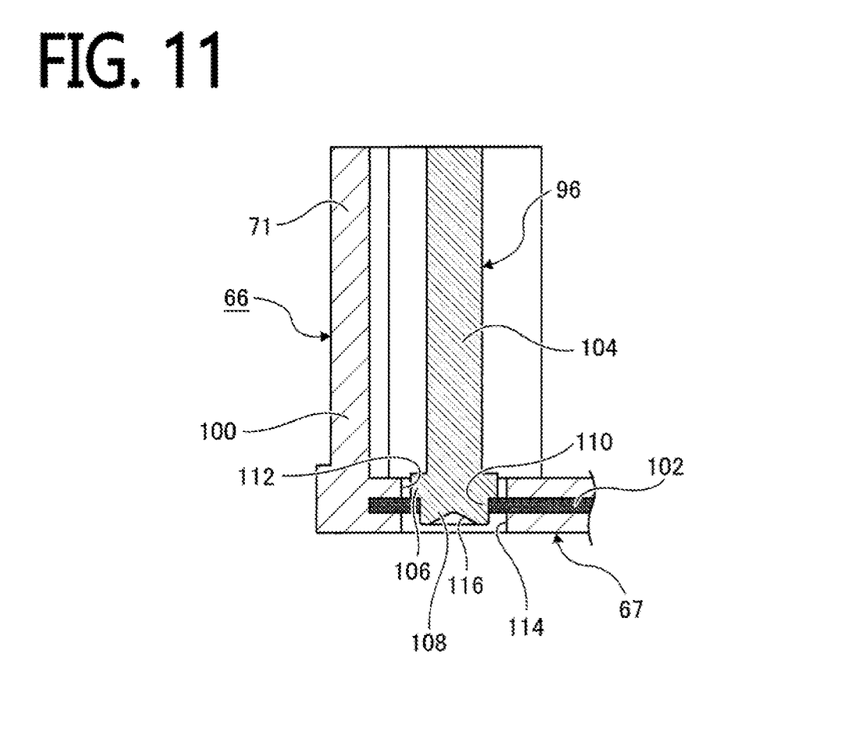
FIG. 11 is an enlarged sectional view of the portion "B" of FIG. 10, for illustrating the support plate, the first guiding shaft, and the second guiding shaft used in the camera device according to the embodiment of the present invention.

Meanwhile, as illustrated in FIG. 11, in the base 66, a first insertion hole 110 is formed in the support plate 102, and a second insertion hole 112 and a third insertion hole 114 are respectively formed in the base main body 100 on an upper side and a lower side of the support plate 102 so as to surround a periphery of the first insertion hole 110.

The insertion portion 108 of each of the first guiding shaft 96 and the second guiding shaft 98 is inserted in the first insertion hole 110 of the support plate 102, and protrudes in the third insertion hole 114 of the base main body 100. Further, the flange portion 106 of each of the first guiding shaft 96 and the second guiding shaft 98 is inserted in the second insertion hole 112 of the base main body 100, and is held in abutment against the support plate 102 along the periphery of the first insertion hole 110 of the support plate 102.

A lower end of the insertion portion 108 of each of the first guiding shaft 96 and the second guiding shaft 98 is caulked by the support plate 102, and thus is formed into a caulked portion 116. The caulked portion 116 and the flange portion 106 sandwich the periphery of the first insertion hole 110 of the support plate 102, and thus each of the first guiding shaft 96 and the second guiding shaft 98 is fixed to the support plate 102. The caulked portion 116 may be formed by normal press working, or may be formed by a method called high-spin caulking or spin caulking in order to reduce an influence of pressure on other portions. The high-spin caulking or the spin caulking is a processing method in which a tip to be processed is squeezed by a rotating tool.

As illustrated in FIG. 1 and FIG. 12 to FIG. 14, an upper end of each of the first guiding shaft 96 and the second guiding shaft 98 is fixed to the second magnetic member 92 described above. That is, both upper ends of the second magnetic member 92 in the X direction are bent in the Y direction, and thus are formed into upper fixing portions 118 and 118. The upper end of the first guiding shaft 96 and the upper end of the second guiding shaft 98 are inserted and fixed in fourth insertion holes 120 and 120 formed in the upper fixing portions 118 and 118, respectively. In this embodiment, the second magnetic member 92 also has a function of supporting the first guiding shaft 96 and the second guiding shaft 98, thereby being capable of reducing the number of components as compared to a case in which a component configured to support the first guiding shaft 96 and the second guiding shaft 98 is provided separately. Further, the first guiding shaft 96 and the second guiding shaft 98 can be supported stably.

Figure 12:
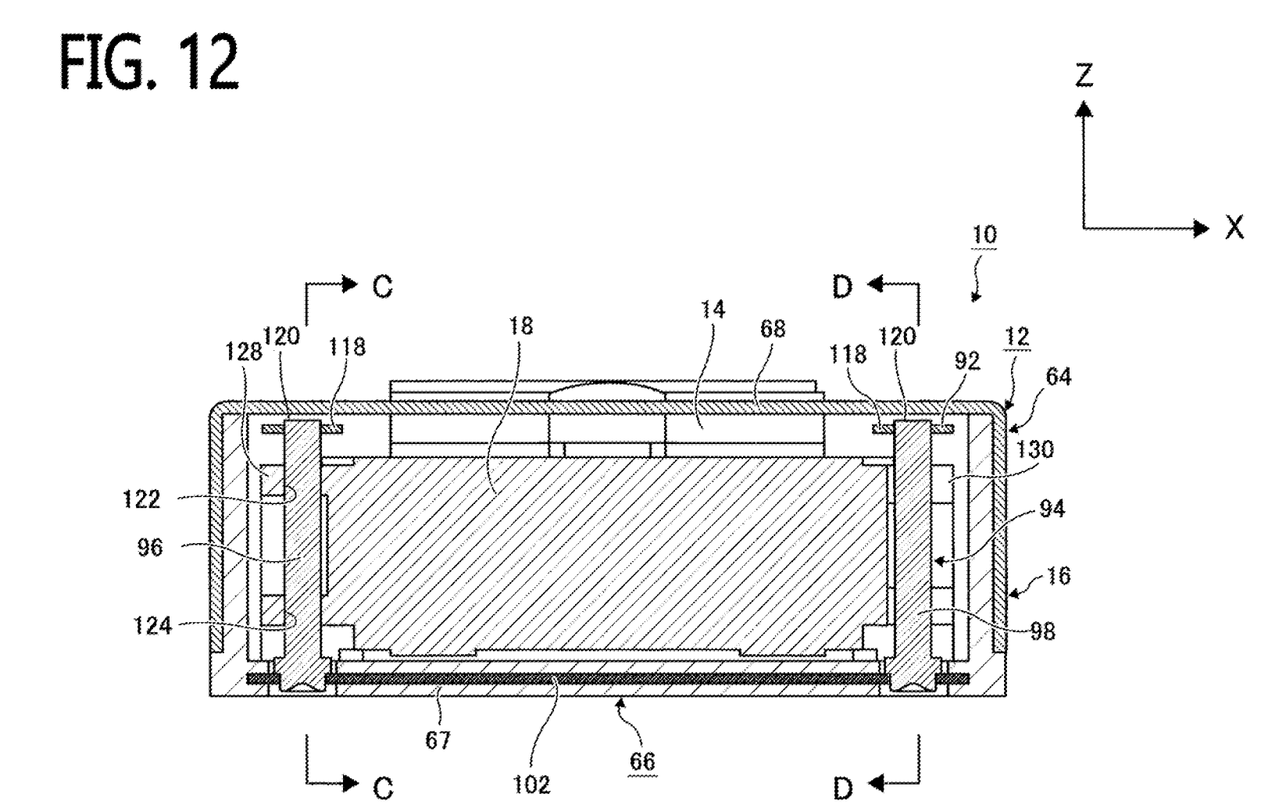
FIG. 12 is a sectional view for illustrating the camera device according to the embodiment of the present invention, which is taken along the XZ plane.
Figure 13:
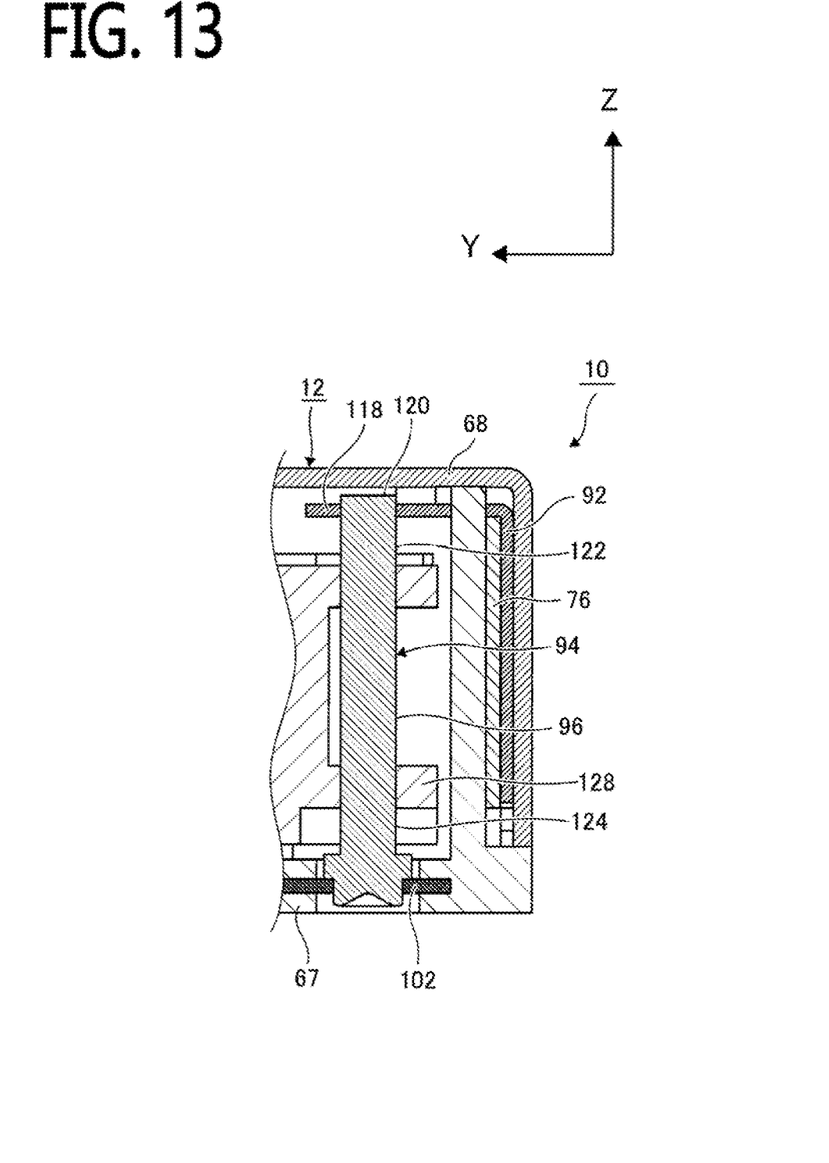
FIG. 13 is a sectional view for illustrating the camera device according to the embodiment of the present invention, which is taken along the line C-C of FIG. 12.

As illustrated in FIG. 12 and FIG. 13, the third support portion 128 described above includes a first contact portion 122 and a second contact portion 124 arranged away from each other in the Z direction. In this embodiment, the first contact portion 122 and the second contact portion 124 are each formed as a circular hole, and are held in contact with an outer surface of the first guiding shaft 96 in a range of 360 degrees in a circumferential direction in an XY-direction cross section of the first guiding shaft 96.

Figure 14:
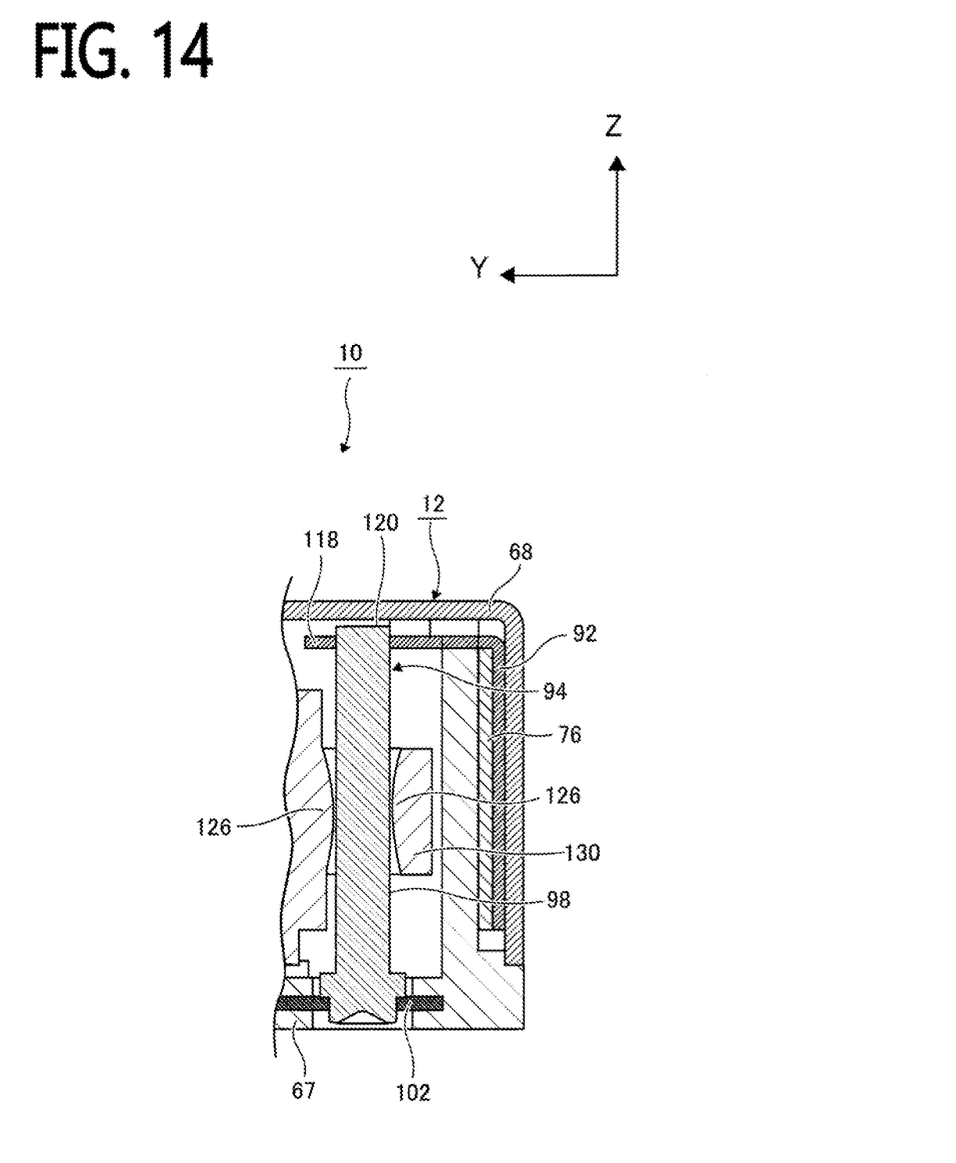
FIG. 14 is a sectional view for illustrating the camera device according to the embodiment of the present invention, which is taken along the line D-D of FIG. 12.

Further, as illustrated in FIG. 12 and FIG. 14, in the XY-direction cross section, the fourth support portion 130 described above includes two wall surfaces arranged so as to be opposed to each other in the Y direction. Both the wall surfaces of the fourth support portion 130 protrude as curved surfaces toward the second guiding shaft 98 side, to thereby form protruding portions 126 and 126. Middles of the protruding portions 126 and 126 are held in contact with the second guiding shaft 98. The second guiding shaft 98 is held in contact with the fourth support portion 130 at two points in the Y direction, thereby reducing a frictional resistance.

In the above-mentioned configuration, with energization to the first coils 82 and 82 opposed to the first magnets 58 and 58 on the two surfaces in the X direction in which magnetic fluxes in the Z direction are interposed, currents flow through the first coils 82 and 82 in the Y direction, and a Lorentz force acts on the first coils 82 and 82 in the X direction by the Fleming's left hand rule. The first coils 82 and 82 are fixed to the base 66, and hence the lens support 20 and the first moving body plate 26 move in the X direction while being supported by the first support mechanism 40 with a reaction force acting on the first magnets 58 and 58 serving as a drive force for the lens support 20 and the first moving body plate 26.

Further, with energization to the first coil 82 opposed to the first magnet 58 on the one surface in the Y direction in which magnetic fluxes in the Z direction are interposed, currents flow through the first coil 82 in the X direction, and a Lorentz force acts on the first coil 82 in the Y direction by the Fleming's left hand rule. The first coil 82 is fixed to the base 66, and hence the lens support 20 moves in the Y direction while being supported by the second support mechanism 42 with a reaction force acting on the first magnet 58 serving as a drive force for the lens support 20.

When the energization to the first coil 82 is canceled after the lens support 20 is moved in any one of the X direction and the Y direction, the lens support 20 stops at a position at which the energization is stopped due to the attraction force between the first magnets 58 and 58 and the first magnetic members 60 and 60, the friction between the first support portion 44 and the first guiding portion 46, and the friction between the second support portion 48 and the second guiding portion 50.

Next, with energization to the second coil 84 arranged between the second magnet 62 and the second magnetic member 92 in which magnetic fluxes in the Y direction are interposed, currents flow through the second coil 84 in the X direction, and a Lorentz force acts on the second coil 84 in the Z direction by the Fleming's left hand rule. The second coil 84 is fixed to the base 66, and hence the moving body 18 moves in the Z direction while being supported by the optical axis-direction support mechanism 94 with a reaction force acting on the second magnet 62 serving as a drive force for the moving body 18.

When the energization to the second coil 84 is canceled after the moving body 18 is moved in the Z direction, the moving body 18 stops at a position at which the energization is stopped due to the attraction force between the second magnet 62 and the second magnetic member 92, the friction between the first guiding shaft 96 and the third support portion 128, and the friction between the second guiding shaft 98 and the fourth support portion 130.

Here, the moving body 18 is guided while being supported by the first guiding shaft 96 and the second guiding shaft 98 on one side of the moving body 18 in the Y direction. The first guiding shaft 96 and the second guiding shaft 98 are fixed to the support plate 102 made of a metal, thereby being capable of suppressing inclinations of the first guiding shaft 96 and the second guiding shaft 98.

Further, even when the third support portion 128 or the fourth support portion 130 is slightly deformed, the first guiding shaft 96 and the second guiding shaft 98 each have a shape extending in the Z direction, and hence a force is applied to the first guiding shaft 96 and the second guiding shaft 98 not locally but successively along the Z direction. Accordingly, abrupt motion change does not occur due to, for example, a reciprocating motion of the moving body 18. Therefore, the smooth movement of the lens support 20 can be ensured.

The moving body 18 is supported by the optical axis-direction support mechanism 94 provided on the Y direction side, and further the moving body 18 is heavy because the first magnets 58 and the like are provided. Therefore, a moment of hanging downward in the Z direction is generated. However, the optical axis-direction support mechanism 94 is supported by the first guiding shaft 96 and the second guiding shaft 98 extending in the Z direction, and hence as compared to a case in which balls are used for support as in the related art, the above-mentioned hanging downward can be reduced.

In this embodiment, the lens driving device 12 has a focus adjusting function and an image stabilization function, but may include only one of them, or may further have a zoom function, for example. The lens driving device 12 to be used in the camera device 10 is described herein, but the present invention is also applicable to other devices.

What is claimed is:

1. A lens driving device, comprising:
a base including a bottom surface portion;
a guiding shaft provided perpendicularly to the bottom surface portion of the base; and
a lens support guided by the guiding shaft,
the base including:
a base main body; and
a support plate, which is made of a metal, and is provided in the base main body,
wherein one end of the guiding shaft is fixed to the support plate.

2. The lens driving device according to claim 1,
wherein the base main body is made of a resin, and
wherein the support plate is embedded in the base main body.

3. The lens driving device according to claim 1, wherein the support plate is formed along an entire periphery of the base.

4. The lens driving device according to claim 1,
wherein the guiding shaft includes:
a guiding shaft main body portion; and
an insertion portion formed integrally with the guiding shaft main body portion, and
wherein the insertion portion is inserted in an insertion hole formed in the support plate.

5. The lens driving device according to claim 4, wherein the insertion portion of the guiding shaft is caulked to be fixed to the support plate.

6. The lens driving device according to claim 4, wherein the insertion portion is thicker than the guiding shaft main body portion.

7. The lens driving device according to claim 4,
wherein the guiding shaft includes a flange portion formed between the guiding shaft main body portion and the insertion portion so as to be thicker than the guiding shaft main body portion and the insertion portion, and
wherein the flange portion is held in abutment against the support plate.

8. A camera device, comprising:
the lens driving device of claim 1; and
a lens supported by the lens support.

9. An electronic apparatus, comprising the camera device of claim 8.

* * * * *